Feb. 20, 1940. V. F. HAMMEL 2,191,152
ELECTRICAL INSULATOR
Original Filed Aug. 31, 1934 5 Sheets-Sheet 1
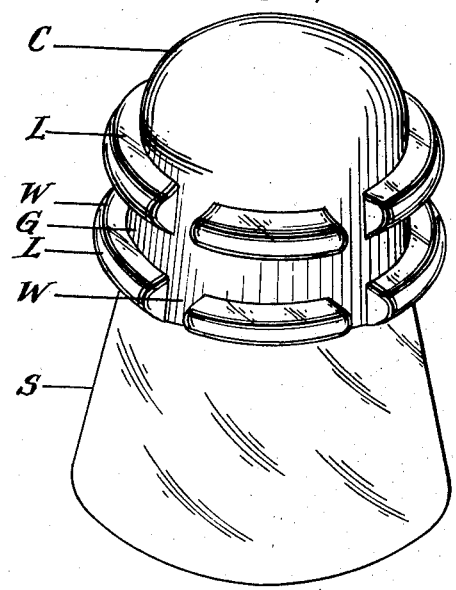
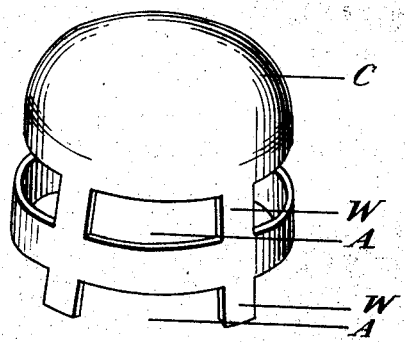
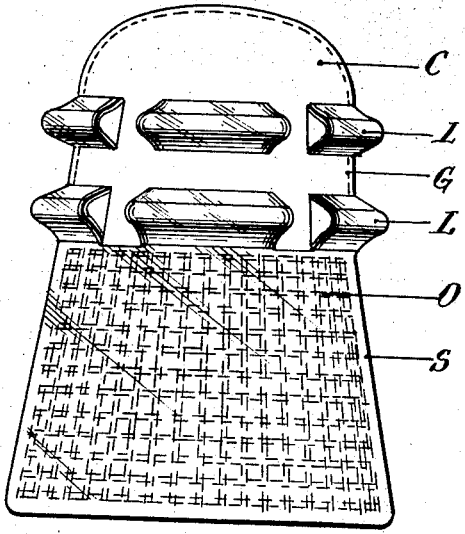
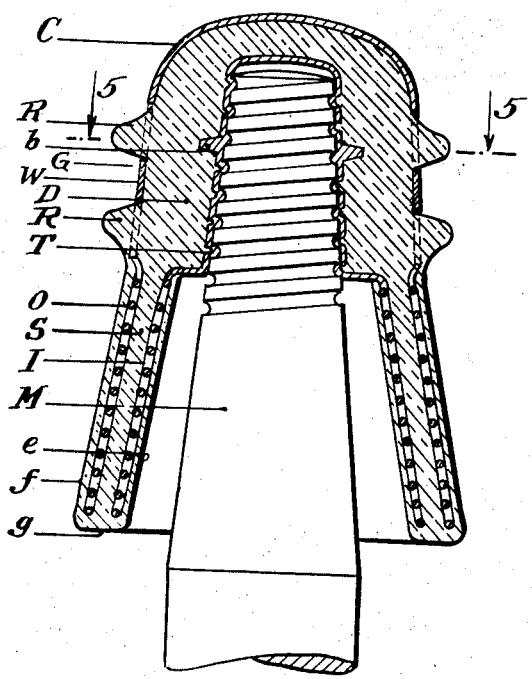
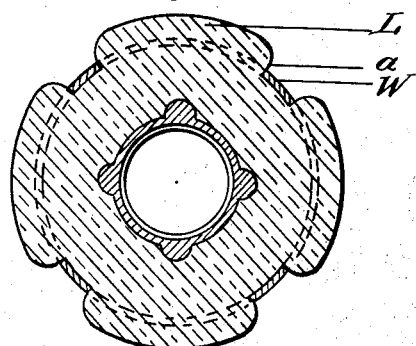
INVENTOR
VICTOR F. HAMMEL
BY
ATTORNEYS Feb. 20, 1940. V. F. HAMMEL 2,191,152
ELECTRICAL INSULATOR
Original Filed Aug. 31, 1934 5 Sheets-Sheet 2
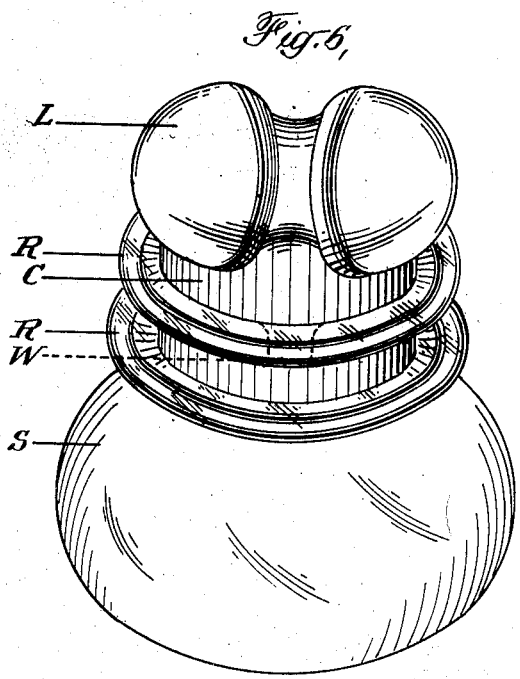
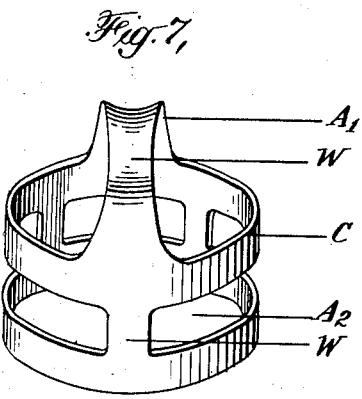
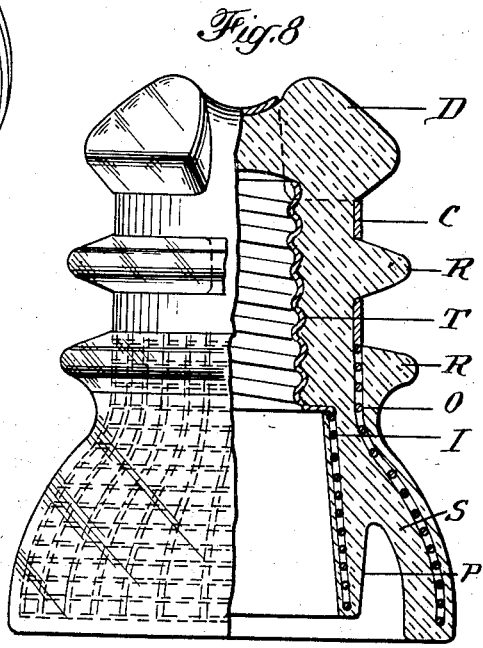
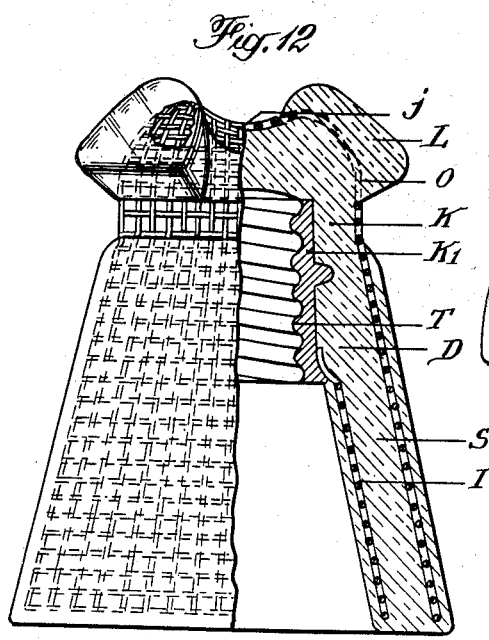
INVENTOR
VICTOR F. HAMMEL
BY
ATTORNEYS

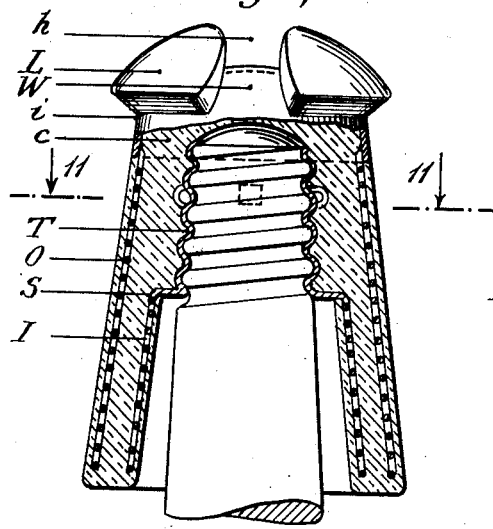
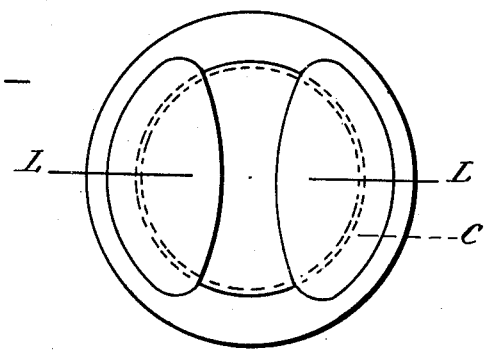
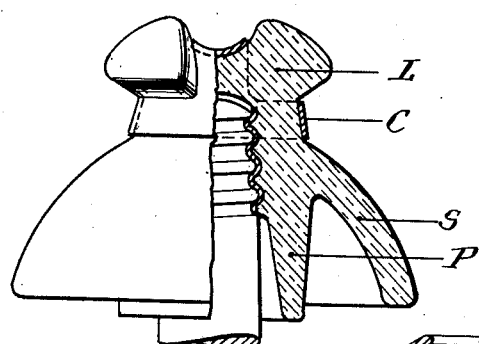
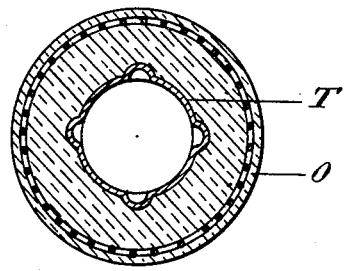
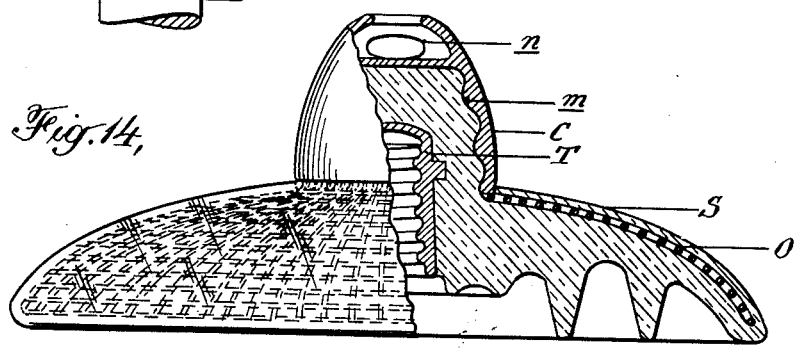

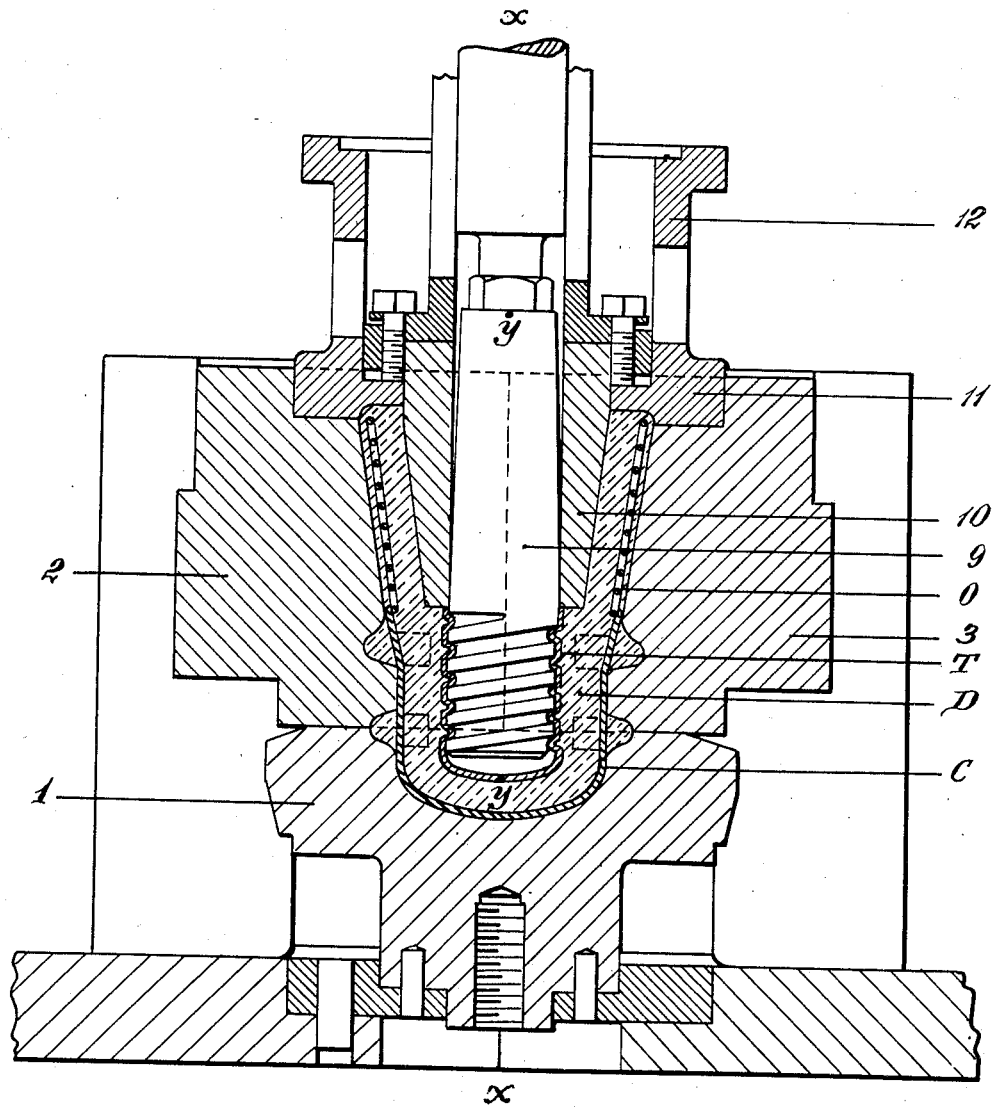

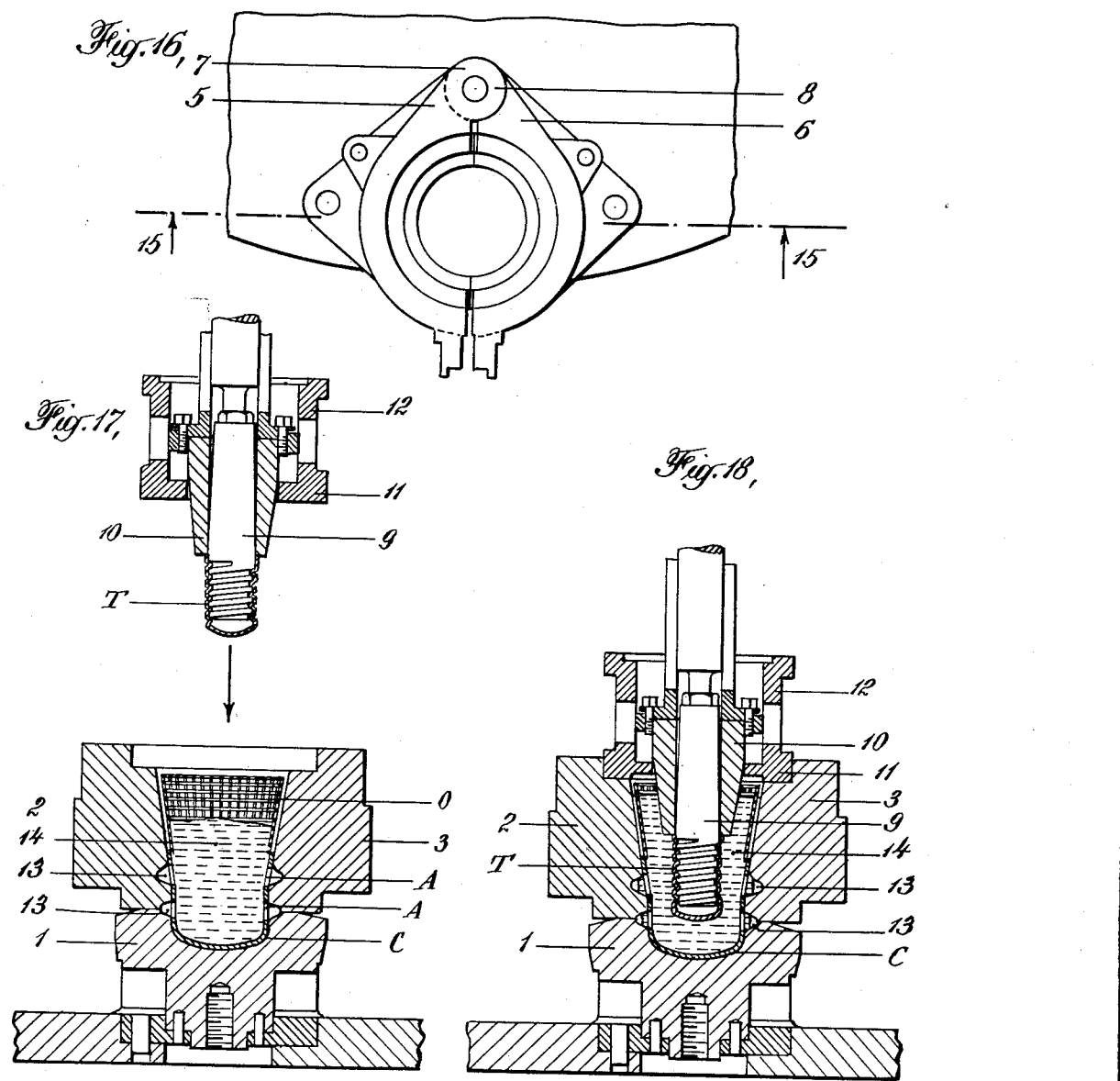

Patented Feb. 20, 1940

2,191,152

UNITED STATES PATENT OFFICE 2,191,152

ELECTRICAL INSULATOR

Victor Frank Hammel, Richmond Hill, N. Y.

Original application August 31, 1934, Serial No. 742,313. Divided and this application June 25, 1935, Serial No. 28,284

10 Claims. (Cl. 174—140)

This invention relates to improvements in electrical insulators and to methods for making them. The principles of construction herein described are of especial utility as applied to insulators for supporting overhead conductors of power and telephone lines, and as to the latter, particularly high frequency or so-called "carrier current" communication lines.

This application is a division of my copending application Serial No. 742,313, filed August 31, 1934, and issued August 10, 1937 as Patent No. 2,089,791.

An object of the invention is to provide electrical insulators which are metallically strengthened externally or internally or both externally and internally with accompanying improvements in performance including: reduction of power losses in the insulators particularly at high or "carrier" frequencies, elimination of factors productive of radio interference, and minimization of arcing and breakdown.

Construction of insulators such as are herein described has necessitated the formulation of manufacturing methods believed original. It is a primary object to explain and encompass as part of this invention these novel processes.

Power line installations have in the past utilized insulators of a type consisting exclusively of a dielectric shell, sometimes internally threaded for mounting on a cross arm pin, and provided with a grooved head for securing the line conductor by means of a tie wire. Extensive tests have demonstrated this construction to be a prolific source of radio disturbance. The relatively slight area of intimate contact between the line conductor, the tie wire and the insulator on the one hand, and between the insulator and the cross arm pin on the other, gives rise to excessive electrostatic potential gradients which produce ionization within the small air gaps existing between and adjacent the several elements thus mechanically joined.

As the voltage wave rises to its peak each half-cycle, this ionization increases until a miniature arc is produced. The electrical constants of the system are generally such that the accompanying transient electrical discharge is of damped oscillatory character and usually inclusive of frequencies within a relatively wide high frequency band observable as static in radio receivers. Atmospheric ionization initiated by these minute intermittent discharges, has a tendency to spread, particularly in inclement or foggy weather, and to establish a permanent corona surrounding the insulator inducing flashovers of short circuit magnitude between the line and the insulator support.

A number of proposals have been advanced for overcoming these tendencies. It has been suggested to coat the insulator adjacent the line conductor with a thin covering of a conductive medium such as metallic paint thereby to minimize electrostatic flux concentration by virtue of this potential equalizing surface. This expedient is open to the criticism that the coating soon wears away, initially in spots with resulting localized ionization and gap discharges between spots. With the coating entirely eroded the insulator is reduced to an exclusively dielectric shell subject to the defects noted.

Another proposal has been to surmount the dielectric shell of the insulator with a metallic cap or bushing for attaching the line conductor, and sometimes to provide additionally a metallic insulator support attached to the dielectric. While the known constructions of this character tend toward overcoming certain of the mentioned disadvantages, the practical expedients resorted to for affixing the metallic cap and support to the dielectric shell have militated against success.

Thus for eliminating the troublesome air gaps referred to, it has been proposed to cement the metallic cap and line conductor supports to the insulator, or to bolt the components together and fill the unavoidably resulting air gaps with an insulating compound such as asphalt emulsion. The efficacy of both these expedients is destroyed by mechanical shock to which the insulator is subjected in service, due, for example, to pole vibration or line swinging during storms. The cement tends to crack and break loose while the compound is simply squeezed out of the gaps. The cement, moreover, usually has dielectric properties different from those of the insulator proper, and this together with unavoidable jagged or sharp edges thereof requisite to adhesion, unduly concentrates the electrostatic flux at focal points inducing dielectric failure.

The novel constructions and processes of this invention inherently eliminate the above and like defects of known arrangements and methods of attachment by providing an insulator wherein metallic supports or strengthening and potential equalizing members are embedded, at least in part, directly in the dielectric medium while in a plastic state in process of formation. Thus in the finished insulators of this invention the metallic members are permanently locked in intimate contact with the dielectric thereby avoiding the necessity for temporary palliatives, such as the cementing of parts or the use of filler compounds to eliminate air gaps.

A form of insulator embodying this construction and incorporating certain features of this invention comprises a skirted dielectric shell surmounted by a metal cap apertured or slotted to provide spaced webs through and between which the dielectric medium is extruded in a plastic state to form protuberant lobes permanently affixing the cap to the shell. A slightly modified construction is that in which the dielectric extrusions are shaped confluently about the webs to provide continuous ribs peripherally surrounding and engaging the cap. With either arrangement, a metallic thimble, bushing or the like is preferably disposed within the shell in spaced relation to the cap and embedded in part directly in the dielectric.

The cap being in metallic contact with the line conductor serves to apply the line potential uniformly to a relatively large area of the dielectric, thereby to prevent excessive electrostatic flux concentration and arcing. Similarly the metallic insulator support or thimble, being grounded, will apply ground potential to all portions of the insulator dielectric in contact therewith. The insulator becomes thus in effect an electrostatic condenser of relatively large area throughout which the electrostatic flux distribution is reasonably uniform and of relatively low density and across which the potential gradient from the line conductor to the insulator mounting is fairly constant and representative of the average. Since a large portion of the dielectric is thus about equally stressed, the insulator functions with high effectiveness in resisting breakdown due to excessive line potentials.

Equalization of the electrostatic flux distribution and potential gradient may likewise be secured in the dielectric skirt of the insulator by embedding therein one or more metallic webs or screens permeating the skirt. One such screen embedded adjacent the outer surface of the skirt and conductively joined to the cap not only improves the electrical characteristics of the insulator along the lines explained, but in addition greatly strengthens the skirt mechanically. Substantially complete electrical equalization may, however, be secured by embedding a second screen in the skirt adjacent its inner surface and in spaced relation to the first, the inner screen being conductively joined to the metallic insulator mounting or bushing.

These screens must of necessity be completely embedded in the skirt in order to maintain a leakage path of high resistance over the surface of the skirt and between the line conductor and the grounded insulator support. Otherwise flashover and short-circuiting would be induced with relative ease.

An equivalent electrical construction to that of a metallic cap surmounting the dielectric shell and connected to a screen permeating the skirt, is that wherein the cap is omitted and the screen extended continuously throughout the entire contour area of the shell, being conductively exposed through the head to the line conductor and tie wire.

On electrical communication lines, the principal insulator problem is that of minimizing attenuation of the relatively minute signaling currents. Particularly at high or carrier frequencies where the signaling current is rapidly attenuated by the line, it becomes essential to conserve the signal strength and thus increase the permissible spacing between signal amplifying repeater stations.

The glass or exclusively dielectric insulator familiarly employed on communication lines, is roughly equivalent electrically to a plurality of resistances serially connected between the line conductor and the supporting pin, with small capacities connected from the pin to points intermediate the resistances respectively. The resistances represent the leakage paths across contiguous elementary surface areas of revolution, the series resistances in aggregate being equal to the total resistance of the surface leakage path from the line conductor to the pin. The capacities are those of the dielectric between the respective surface areas and the pin. There are thus interposed between the line conductor and the pin, a multiplicity of leakage paths each comprising in general a certain amount of resistance in series with capacity, the proportion of each in a particular case, depending on that path of the many available, traversed by any particular elementary component of the leakage current.

The resistance component of each leakage path dissipates electrical energy in the form of heat and to this extent attenuates the signal current. In the capacity portion of the path on the other hand the current flow is "wattless", that is to say, just as much energy is returned to the system on the average as is supplied to the capacity, so that there is no net energy loss.

Elimination of the resistance component of each elementary leakage path would therefore prevent signal energy dissipation in the insulator. Although this result is conceivably secured by rendering the dielectric surface a perfect conducter or a perfect insulator, neither is practicable; the first because it would ground the line conductor to the pin, and the second because unavoidable accumulation of dust and other deposits on the surface soon renders it intrinsically a semi-conductor.

A practical solution of this problem is, however, achieved by the insulator construction above referred to employing embedded meshes or screens conductively joined to the line conductor and the insulator mounting respectively. The embedded screens in effect connect all of the elementary dielectric capacities in parallel to form a single relatively large lumped capacity between the line conductor and pin. At high or carrier frequency, this capacity by-passes, around the surface leakage path, the greater portion of the carrier current directly from the line conductor to the pin, thereby greatly reducing energy dissipation of the signals. Since the screens are wholly embedded within the dielectric skirt there is no reduction of the surface resistance or leakage path around the dielectric, so that its insulating properties remain unimpaired.

The novel method which this invention contemplates for permanently embedding the metallic members in the dielectric medium is predicated on a process of extrusion. The member to be embedded is apertured or slotted to provide spaced webs, through and between which the dielectric in a fused or otherwise plastic state is extruded, the extrusions being formed into separate protuberances or shaped confluently about the webs as continuous ribs or as an unbroken surface wholly embedding the metallic member in the dielectric.

Referring now to the drawings:

Figs. 1-5 inclusive illustrate an insulator in accordance with the invention wherein a slotted metallic cap surmounts a skirted dielectric shell protuberantly extruded in part through the cap slots to provide spaced lobes permanently affixing the cap to the shell. These figures also depict the optional inclusion of outer and inner webs or screens completely embedded in and permeating the skirt and connected respectively to the cap and to a threaded metal thimble or bushing disposed within the skirt and embedded in part in the dielectric for mounting the insulator. The metal cap and thimble are preferably of stamping thickness. Fig. 1 is a perspective view of the complete insulator; Fig. 2 perspective of the metallic cap; Fig. 3 is a side elevation of the complete insulator; Fig. 4 a longitudinal section along the axis of the Fig. 3 insulator; and Fig. 5 a section along 5—5 of Fig. 4.

Figs. 6 to 8 show an insulator generally similar to that of Figs. 1-5 inclusive but modified as to shape and manner of affixing the slotted metallic cap to the dielectric shell. If this modification the extruded dielectric medium is shaped in part confluently about the spaced webs separating the slots to form continuous ribs surrounding the cap, and in part as protuberant lobes. Fig. 6 is a perspective of the complete insulator; Fig. 7 a perspective of the metal cap; and Fig. 8 a side elevation partly in section.

Fig. 9 is a side elevation partly in section; Fig. 10 a plan view, and Fig. 11 a section along 11—11 of Fig. 9 of an insulator generally similar to that of Figs. 6 to 8 inclusive, the principal difference residing in reliance exclusively upon separate protuberant lobes for securing the cap to the dielectric shell.

Fig. 12 is a side elevation partly in section of a construction wherein an embedded outer screen extends throughout the skirt and head of the dielectric shell in exposed relation to the line conductor and tie wire.

Fig. 13 is a side elevation partly in section of a power line insulator generally like that of Figs. 9-11 inclusive except for omission of the embedded screens.

Fig. 14 shows in side elevation partly in section of a high tension power line insulator incorporating certain features above referred to.

Figs. 15 to 18 inclusive illustrate the manner in which the novel process of the present invention for making insulators may be practiced by employment of an apertured mold and associated core member. Fig. 15 is a sectional elevation along 15—15 of Fig. 16, of the mold with the core member in situ for forming the finished insulator. Fig. 16 is a plan view of the mold. Figs. 17 and 18 are sectional elevations similar to Fig. 15, but with the core member shown in certain positions of elevation with respect to the mold aperture assumed in the process of insulator formation.

Referring to Figs. 1-5 inclusive, the insulator comprises a dielectric shell D of bell shaped configuration terminating in a skirt S. This shell may be of any suitable vitreous, ceramic, or other highly insulating dielectric medium, such as glass, porcelain, fused rock, etc. In Fig. 3 the dielectric medium is indicated as transparent primarily to show the outer screen O optionally embedded in the skirt.

Surmounting the shell D is a metallic cap C peripherally apertured or slotted, as at A, to provide spaced webs W, through and between which the dielectric medium of shell D, is extruded to provide spaced protuberant lobes L permanently locking the cap and shell in intimate contact, and conjointly forming a peripheral groove G for attaching a line conductor and tie wire. As shown more particularly in Fig. 5, the lobes L may be so formed as to overhang slightly the webs W of the cap, as indicated at $a$, thereby to accentuate the locking engagement of cap and shell.

For removably mounting the insulator upon a pin M, preferably of metal, an internally threaded metallic bushing, thimble, or the like T, is disposed within the shell D in spaced relation to cap C, and permanently embedded in part in the dielectric medium as shown. The embedded portion may include lugs, such as $b$, to prevent movement of the thimble T with respect to shell D.

The positive engagement of the metallic members C and T with the dielectric shell D, supplemented preferably by a choice of a sufficiently pliable metal or one having a coefficient of thermal expansion equal to that of the dielectric, will assure the permanent elimination of small air gaps between the dielectric and metallic members, thereby preventing arcing such as is productive of radio interference in the manner explained. Moreover, the metallic contact between the line conductor, tie wire and cap C will result in a uniform application of the line potential to the entire external area of the dielectric shell encompassed by the cap. Similarly, the thimble T will maintain all portions of the dielectric in contact therewith at the ground potential of pin M. Cap C, thimble T and the interposed portion of the shell D, thus constitute, as stated, an electrostatic condenser of relatively large plate area throughout which the electrostatic flux distribution is reasonably uniform and across which the potential gradient from the line conductor to the pin is fairly constant and representative of the average gradient.

As employed on high frequency or carrier current communication lines, the capacity formed by the metal cap, thimble and interposed dielectric, by-passes around the surface leakage path $e$, $f$, $g$ of the skirt S, a portion of the high frequency current flowing from the line conductor to the pin. The portion thus by-passed represents "wattless" or non-dissipated signaling energy. The capacity thus formed reduces surface leakage losses to the extent that it by-passes the signaling currents around the leakage path.

This capacity may be further increased and the leakage losses correspondingly further reduced by the addition of outer and inner metallic webs or screens O and I wholly embedded in and permeating the skirt S and conductively joined to the cap C and thimble T respectively as shown. Screens O and I must of necessity be completely embedded in the skirt in order to maintain a long leakage path $e$, $f$, $g$, and thus a high degree of insulation between the line conductor and the pin M.

In the modification of Figs. 6-8 inclusive the metallic cap C is provided in the upper portion with large apertures $A_1$, and in the lower portion with peripherally slotted apertures $A_2$, the apertures being spaced by webs W. The dielectric shell D is extruded through the large apertures $A_1$, to form spaced protuberant lobes L, while the dielectric extrusions through the lower apertures or slots $A_2$ are shaped confluently about the interposed webs W as continuous ribs R peripherally surrounding the cap. The lobes L and ribs R serve to lock the cap and shell in intimate contact and also to provide suitable grooves for supporting a line conductor and affixing a tie wire.

The shell terminates in its lower portion in a skirt S surrounding a petticoat P for increasing the length of the surface leakage path. Permeating metallic webs or screens O and I may, if desired, be embedded within the skirt S and petticoat P respectively.

In the modification of Figs. 9 to 11 inclusive the cap is provided with but two apertures spaced by web W, separating the pair of dielectric lobes L forming grooves h and i across the head of and around the cap respectively for reception of the tie wire and line conductor. The principles of construction are otherwise as described for the previous figures.

In the construction of Fig. 12 the metallic cap C is omitted and the outer embedded screen O made continuous with the skirt S and head of the dielectric shell D. The head of the shell D terminates in knobular lobes L forming a groove therebetween for supporting a line conductor, and a peripheral groove below for affixing the tie wire. At these grooved portions the outer screen O is exposed through the dielectric as at j and k to provide metallic contact between the outer screen, tie wire and line conductor.

The construction of Fig. 13 which shows a power line insulator, is substantially that of Figs. 6–8 except for omission of the peripheral ribs R and the embedded screens.

In the high tension insulator construction of Fig. 14 the metallic cap C is provided with internal ribs m embedded in the dielectric shell. The cap is provided with an anchoring lug n for nesting.

The novel method employing a mold and co-operating core for making insulators embodying the features above described, will now be explained with reference to Figs. 15 to 18 inclusive.

As shown more particularly in Figs. 15 and 16, the mold comprises a bottom plug 1 and sides 2 and 3. The sides are housed in castings 5 and 6, provided with apertured lugs, such as 7, cooperating with a bolt 8 to form a hinged support whereby the sides may be swung open laterally.

The sides and bottom plug of the mold define the outer contour of the finished insulator D, which as illustrated in Fig. 15, is that of Figs. 1–5 inclusive, although it will be understood that a similar mold appropriately modified as to shape is equally applicable for making insulators embodying any of the features of the remaining figures.

The mold is open at the top for reception of a core consisting of a stem 9 rotatable within a petticoat 10, the latter in turn slidingly engaging a mold closure or sealing ring 11 affixed to a housing 12. In the position shown in Fig. 15, the stem, petticoat, and sealing ring define the inner contour of the finished insulator.

Preliminary to making an insulator, the stem, petticoat and sealing ring are vertically withdrawn from the mold aperture as illustrated in Fig. 17. The metal bushing or thimble T is placed on the stem 9 as thus elevated. Also the metal insulator cap C with its attached outer screen O, if the latter is desired in the finished insulator, is dropped or otherwise inserted in the mold aperture as is likewise shown in Fig. 17. If the finished insulator is to incorporate spaced lobes L, such for example as those of Fig. 1, the cap C must be so placed in the mold that the cap apertures A are aligned with the mold concavities 13 which produce lobes L of the insulator. This precaution is not required in the production of insulators provided only with continuous peripheral ribs, such as R of Fig. 6.

A properly regulated charge of the dielectric medium 14 in a fused or otherwise plastic state is next introduced at the mold aperture within the cap and screen. The mold aperture is then closed by downward displacement as a unit of the stem 9, petticoat 10, and sealing ring 11, the stem and petticoat being slightly elevated relative to the sealing ring, Fig. 18, from their ultimate relative positions in forming the insulator, Fig. 15. This is done to assure that the sealing ring will be tightly seated in the mold prior to substantial deformation of the plastic charge by the stem 9 and petticoat 10, as is illustrated in Fig. 18.

With the sealing ring in the position shown in Fig. 18, the downward displacement of the stem and petticoat continues in consequence of which pressure is exerted on the plastic charge 14 thereby to extrude the dielectric through the cap and screen apertures to the mold. As the pressure increases the extrusions are shaped by the mold confluently about the screen webs to form an unbroken outer dielectric surface and embed the screen wholly within the skirt. Depending on the shape of the mold concavities 13, the extrusions through the cap apertures will be formed into spaced protuberant lobes L as in the construction of Fig. 1, or shaped confluently about webs to provide continuous dielectric ribs R surrounding the cap as in the construction of Fig. 6.

The ultimate vertical displacement of the stem and petticoat is as illustrated in Fig. 15 serving thereby in conjunction with the mold and sealing ring to shape the insulator in its finished form. While thus retained, the dielectric medium is cooled or otherwise hardened sufficiently to retain its shape. Thereupon the stem 9 is withdrawn from engagement with the thimble or bushing T leaving the latter embedded in the dielectric medium. The petticoat 10 and sealing ring 11 are vertically withdrawn and the mold walls 2, 3 swung open to expose the finished insulator for removal.

The metal portions of insulators according to the invention not only improve the dielectric properties and eliminate radio interference in the manner aforesaid, but serve additionally to improve the insulators mechanically as by increasing the mechanical strength and ruggedness. Incorporation of the threaded metal bushing for mounting the insulator on a cross arm pin eliminates the necessity for forming threads in the dielectric, while assuring perfect pin threads and eliminating breakage due to pin expansion. The process whereby the metal components are embedded directly in the dielectric while in the plastic state and the locking features provided, such as the dielectric lobes protruding through the cap perforations and the embedded lugs of the bushing, permit of dispensing with bonding cement or alloys, the latter introducing the deleterious effects above described.

What I claim is:

1. An electrical insulator comprising: a dielectric shell of glass, and a preformed perforate metal cap surmounting said shell, said cap having its inner surface embedded directly in said glass, and said glass extending continuously through said cap perforations to form protuberances permanently locking said cap and shell in intimate surface contact.

2. An electrical insulator comprising: a dielectric shell of glass, and a preformed perforate metal cap surmounting said shell, said cap having its inner surface embedded directly in said glass, and said glass extending continuously through said cap perforations to form protuberances permanently locking said cap and shell in intimate surface contact, the metal of said cap having substantially the same coefficient of expansion as said glass.

3. An electrical insulator comprising: a dielectric shell of glass, a preformed perforate metal cap surmounting said shell, said cap having its inner surface embedded directly in said glass, and said glass extending continuously through said cap perforations to form protuberances permanently locking said cap and shell in intimate surface contact, and a preformed metal thimble disposed within said shell, said thimble having its outer surface embedded directly in said glass.

4. Means for supporting outdoor electrical conductors, comprising an electrical insulator including a thin-walled, preformed metal member surrounding and partially encasing an imperforate insulating member of glass, said insulating member having a hollow interior for mounting on a support, a portion of said insulating member extending beyond said metal member to form a skirt of extended surface leakage path between said metal member and said hollow interior, said metal member including its inner surface being permanently embedded directly in the glass and anchored therein, and being of such thickness and material as intimately to engage the glass member without fracture thereof.

5. Means for supporting outdoor electrical conductors, comprising an electrical insulator including an imperforate insulating member of glass having a bore faced with a thin-walled, preformed metal member for mounting on a support, a portion of said metal member including its outer surface being permanently embedded directly in the glass and anchored therein, said metal member being of such thickness and material as intimately to engage the glass member without fracture thereof, said insulating member extending beyond said metal member to form a skirt of extended surface leakage path.

6. In an electrical insulator: an insulating member of glass having an outer surface partially encased in a thin-walled, preformed outer metal member surrounding the same, and an inner bore faced with a thin-walled preformed inner metal member, a portion of said insulating member extending beyond said outer metal member and forming an insulating skirt of glass, said outer metal member including its inner surface and said inner metal member including its outer surface being permanently embedded directly in the glass and anchored therein, and being of such thickness and material as to intimately engage the glass member without fracture thereof.

7. In an electrical insulator: a thin-walled, preformed, perforate metal member surrounding and partially encasing an insulating member of glass, a portion of said metal member including its inner surface being permanently embedded directly in said glass, and said glass extending continuously through the perforations of said metal member to form protuberances permanently locking said glass and metal members in intimate surface contact, and said metal member being of such thickness and material as intimately to engage the glass member without fracture thereof.

8. In an electrical insulator: an insulating member of glass having an outer surface partially encased in a thin-walled, preformed, perforate, outer metal member surrounding the same, and an inner bore faced with a thin-walled preformed inner metal member, said outer metal member including its inner surface and said inner metal member including its outer surface being permanently embedded directly in the glass and anchored therein, and being of such thickness and material as intimately to engage the glass without fracture thereof, said glass extending continuously through the perforations of said outer metal member to form protuberances permanently locking said outer metal and said glass members in intimate surface contact.

9. In an electrical insulator: an insulating member of glass having an outer surface partially encased in a thin-walled, preformed, perforate, outer metal member surrounding the same, and an inner bore faced with a thin-walled, preformed inner metal member having complementary internal and external elevations and depressions formed therein, said outer metal member including its inner surface and said inner metal member including its outer surface being permanently embedded directly in the glass and anchored therein, and being of such thickness and material as intimately to engage the glass member without fracture thereof, and said glass extending continuously through the perforations of said outer metal member to form protuberances permanently locking said outer metal and glass members in intimate surface contact.

10. Means for supporting outdoor electrical conductors, comprising an electrical insulator including an imperforate insulating member of glass having a bore faced with a thin-walled, preformed, metal member for detachable mounting on a support, said metal member having complementary internal and external elevations and depressions formed therein, said metal member including its outer surface being permanently embedded directly in the glass and anchored therein, and being of such thickness and material as intimately to engage the glass member without fracture, said insulating member extending beyond said metal member to form a skirt of extended surface leakage path.

VICTOR FRANK HAMMEL.